United States Patent
Arai (10) Patent No.: US 8,125,693 B2
(45) Date of Patent: Feb. 28, 2012

(54) IMAGE PROCESSING APPARATUS, IMAGE FORMING APPARATUS, IMAGE FORMING METHOD, IMAGE PROCESSING PROGRAM, AND RECORDING MEDIUM

(75) Inventor: Hiroshi Arai, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 633 days.

(21) Appl. No.: 12/211,572

(22) Filed: Sep. 16, 2008

(65) Prior Publication Data

US 2009/0080033 A1    Mar. 26, 2009

(30) Foreign Application Priority Data

Sep. 26, 2007 (JP) ................. 2007-249930

(51) Int. Cl.
*G06F 3/014* (2006.01)
*G06K 9/02* (2006.01)

(52) U.S. Cl. ......... 358/462; 358/1.13; 358/1.9; 358/2.1; 382/312; 715/255

(58) Field of Classification Search ............ 358/400, 358/402, 488, 1.11–1.18, 1.9, 2.1, 505, 462, 358/524; 399/82, 85, 87; 715/200, 201, 715/204, 255, 273, 277, 700
See application file for complete search history.

(56) References Cited

U.S. PATENT DOCUMENTS

| | | | |
|---|---|---|---|
| 5,287,158 A * | 2/1994 | Nagashima et al. | 399/14 |
| 5,550,614 A * | 8/1996 | Motoyama | 399/18 |
| 5,617,485 A * | 4/1997 | Ohuchi et al. | 382/176 |
| 5,790,279 A * | 8/1998 | Sakellaropoulos | 358/498 |
| 5,930,463 A * | 7/1999 | Park | 358/1.14 |
| 6,233,057 B1 * | 5/2001 | Ota | 358/1.13 |
| 6,501,556 B1 * | 12/2002 | Nishii | 358/1.12 |
| 6,856,423 B2 * | 2/2005 | Anderson et al. | 358/1.18 |
| 7,167,283 B2 * | 1/2007 | Ogino | 358/474 |
| 7,359,083 B2 * | 4/2008 | Salgado | 358/1.14 |
| 7,603,618 B2 * | 10/2009 | Mori et al. | 715/229 |
| 7,616,357 B2 * | 11/2009 | Kikuchi | 358/486 |
| 7,698,630 B2 * | 4/2010 | Noda | 715/232 |
| 7,791,755 B2 * | 9/2010 | Mori | 358/1.18 |
| 7,809,978 B2 * | 10/2010 | Nagashima et al. | 714/5.1 |
| 7,903,296 B2 * | 3/2011 | Ishido | 358/474 |
| RE42,290 E * | 4/2011 | Ogino | 358/474 |

(Continued)

FOREIGN PATENT DOCUMENTS

JP    2001-143050    5/2001

(Continued)

OTHER PUBLICATIONS

Japanese Office Action issued Sep. 27, 2011, in Japanese Patent Application No. 2007-249930, filed Sep. 26, 2007, 2 pages.

*Primary Examiner* — Twyler Haskins
*Assistant Examiner* — Chad Dickerson
(74) *Attorney, Agent, or Firm* — Oblon, Spivak, McClelland, Maier & Neustadt, L.L.P.

(57) ABSTRACT

Disclosed is an image processing apparatus that receives image data scanned by first and second image scanning units and performs various image processing. The apparatus includes first and second blank-sheet detection units that detect whether the scanned image data represent a blank sheet. The image processing apparatus determines storage or deletion of the scanned image data based on detection results of the blank-sheet detection units.

15 Claims, 12 Drawing Sheets

U.S. PATENT DOCUMENTS

| | | | |
|---|---|---|---|
| 2003/0161002 A1* | 8/2003 | Nishiwaki et al. | 358/1.15 |
| 2005/0094208 A1* | 5/2005 | Mori | 358/1.18 |
| 2005/0190382 A1* | 9/2005 | van Os | 358/1.1 |
| 2006/0209348 A1* | 9/2006 | Tabata | 358/3.28 |
| 2008/0091636 A1* | 4/2008 | Ferlitsch | 707/1 |
| 2009/0030949 A1* | 1/2009 | Saito | 707/200 |

FOREIGN PATENT DOCUMENTS

| | | | |
|---|---|---|---|
| JP | 2001143050 A | * | 5/2001 |
| JP | 2002-218248 | | 8/2002 |
| JP | 2005-109754 | | 4/2005 |
| JP | 2005-354591 | | 12/2005 |
| JP | 2007-036732 | | 2/2007 |

* cited by examiner

BLANK SHEET DETECTED!

<SCANNING HISTORY>
P1: NON-BLANK
*P2: BLANK :DELETED
P3: NON-BLANK
P4: NON-BLANK
. . .

FIG.13

IMAGE PROCESSING APPARATUS, IMAGE FORMING APPARATUS, IMAGE FORMING METHOD, IMAGE PROCESSING PROGRAM, AND RECORDING MEDIUM

BACKGROUND OF THE INVENTION

1. Field of the Invention

The present invention relates to an image processing apparatus that scans the front and rear surfaces of a document and detects whether the scanned document is a blank sheet, an image forming apparatus having the image processing apparatus, an image processing method performed by the image processing apparatus, an image processing program that causes a computer program to perform the image processing method, and a recording medium having the image processing program recorded thereon.

2. Description of the Related Art

Up until now, known image processing apparatuses scan a document image and perform a blank-sheet detection process based on the characteristics of the data of the scanned image. As examples of the image processing apparatuses of this type, the inventions described in Patent Documents 1 through 3 are known.

Patent Document 1 describes a technique that is capable of acquiring image data according to plural image conditions (such as resolution) and that performs a blank-sheet detection process at low resolution, scans a document at high resolution when the document is not a blank sheet, and accumulates image data. Specifically, a scanner has an image memory that stores the image data scanned from the document by an image sensor, an image processing unit that applies image processing to the image data, and a transmission unit that transmits the image data to external devices. The image processing unit is arranged in a path through which the image data are transferred from the image memory to the transmission unit, making it possible to change the content of an image processed by the image processing unit. The external devices acquire and analyze first image data processed by the scanner according to a first image mode and has an image analysis unit that detects the status (e.g., blank or nonblank) of the document of which the first image data have been scanned. Based on a detection result of the image analysis unit, the external devices acquire second image data processed by the scanner according to a second image mode.

Patent Document 2 refers to a case in which double-sided/single-sided documents are mixed together and describes a technique that faithfully outputs the documents when the documents are output in the form of a sheet or that skips a blank sheet when the documents are saved in an electronic file in one scanning. Specifically, a blank-sheet detection unit performs a blank-sheet detection process with respect to scanned data, a blank sheet page processing unit deletes the scanned data of a page detected to be a blank sheet, and an electronic file conversion unit converts the scanned data of a page detected not to be a blank sheet into an electronic file and then bundles the pages converted into the electronic files. A file management module stores the electronic files in a file storage module. A print image conversion unit converts the scanned data into print images. A print image account unit calculates the accounts of the print images. The print images are transmitted to a printer by a print image transmission module.

Patent Document 3 describes a technique that changes blank-sheet detection parameters according to resolution. Specifically, thresholds adapted to correspond to line densities are stored in a RAM. A line density determination unit determines a set line density in scanning a document, and a threshold selection unit and a setting unit set the threshold corresponding to the line density to detect whether the document is a blank sheet. The thresholds adapted to correspond to the line densities stored in the RAM are automatically changed based on instructions from the user or the number of black pixels scanned from a document having a large white area which is to be used as an ordinal document.

Patent Document 1: JP-A-2005-109754
Patent Document 2: JP-A-2005-354591
Patent Document 3: JP-A-2001-143050

As described above, the known image processing apparatuses scan the document image and perform the blank-sheet detection process based on the characteristics of the image data. In determining the status of the document, the image processing apparatuses of this type perform binarization processing based on a certain threshold and make a count of how many black pixels exist in the document to find out whether the counted number of black pixels exceeds a certain number. However, in case the document is a double-sided document having information printed on both its front and rear surfaces, the number of black pixels may not be detected due to offset from the surface on the opposite side when the number of black pixels of the surface on one side is counted. Furthermore, it is necessary to change the parameters for detecting a blank sheet such as binarized thresholds and the number of counted black pixels when image data from scanners having different scanning characteristics are received at the same time.

SUMMARY OF THE INVENTION

In view of the above circumstances, the present invention is directed at determining whether a document is a blank sheet even when receiving image data from scanners having different scanning characteristics at the same time and attempting to definitely deal with the information of the document in accordance with the determination result.

According to a first aspect of the present invention, there is provided an image processing apparatus that receives image data scanned by plural scanning units and performs various image processing. The apparatus comprises plural blank-sheet detection units that detect whether the scanned image data represent a blank sheet; wherein storage or deletion of the scanned image data is determined based on detection results of the blank-sheet detection units.

In this case, setting values of the blank-sheet detection units may be determined in accordance with scanning characteristics of the plural scanning units.

According to a second aspect of the present invention, there is provided an image processing apparatus that receives image data scanned by plural scanning units and performs various image processing via a predetermined image processing path. The apparatus comprises a storage unit that temporarily stores the image data scanned by the plural scanning units; and an image processing unit that retrieves the image data stored in the storage unit and performs image processing of the retrieved image data via the predetermined image processing path; wherein the image processing unit includes a blank-sheet detection unit.

In this case, the blank-sheet detection unit may be provided in the image processing path, and the blank-sheet detection unit may change a setting for detecting a blank sheet in accordance with scanning characteristics of the plural scanning units.

Furthermore, according to the first and second aspects of the present invention, the image processing apparatus may further comprise a display unit that displays a detection content detected by the blank-sheet detection units. Also, the image processing apparatus may further comprise a selection unit that selects whether the image data are stored or deleted based on the detection results of the blank-sheet detection units. In this case, a message as to whether the image data represent the blank sheet may be displayed on the display unit based on the detection results of the blank-sheet detection units.

Moreover, the image processing apparatus may further comprise a selection unit that selects whether the image data are stored or deleted based on a display of the display unit. In addition, the storage or the deletion of the image data may be determined based on whether the image data represent the blank sheet. In this case, a display unit may display statuses of the storage and the deletion of the image data in association with information whether the image data represent the blank sheet.

According to a third aspect of the present invention, there is provided an image forming apparatus having the image processing apparatus according to the first and second aspects.

According to a fourth aspect of the present invention, there is provided an image processing method for receiving image data scanned by plural scanning units and performing various image processing. The method comprises a detection step for detecting whether the scanned image data represent a blank sheet with plural blank-sheet detection units; and a determining step for determining storage or deletion of the scanned image data based on detection results of the detection step.

According to a fifth aspect of the present invention, there is provided an image processing method for receiving image data scanned by plural scanning units and performing various image processing via a predetermined image processing path. The method comprises a storage step for temporarily storing the image data scanned by the plural scanning units in a storage unit; and an image processing step for retrieving the image data stored in the storage step and performing image processing including a blank-sheet detection process of the retrieved image data via the predetermined image processing path.

In this case, the image processing method may further comprise a display step for displaying on a display unit a message as to whether the image data represent the blank sheet in accordance with the detection results of the blank-sheet detection units. Also, the image processing method may further comprises a selection step for selecting whether the image data are stored or deleted based on a display of the display unit. Also, the image processing method may further comprise a determining step for determining the storage or the deletion of the image data based on whether the image data represent the blank sheet.

According to a sixth aspect of the present invention, there is provided an image processing program that receives image data scanned by plural scanning units and performs various image processing. The program comprises a detection process for detecting whether the scanned image data represent a blank sheet with plural blank-sheet detection units; and a determining process for determining storage or deletion of the scanned image data based on detection results of the detection process.

According to a seventh aspect of the present invention, there is provided an image processing program that receives image data scanned by plural scanning units and performs various image processing via a predetermined image processing path. The program comprises a storage process for temporarily storing the image data scanned by the plural scanning units in a storage unit; and an image processing process for retrieving the image data stored based on the storage process and performing image processing including a blank-sheet detection process of the retrieved image data via the predetermined image processing path.

According to an eighth aspect of the present invention, there is provided a recording medium in which the image processing program according to the sixth or seventh aspect is recorded in a manner capable of being read and performed by a computer.

Note that in the embodiments described below, the plural scanning units correspond to an image scanning unit 1 a first image scanning unit 1a, and a second image scanning unit 1b; the plural blank-sheet detection units correspond to blank-sheet detection units 20, 20a, and 20b; the determination of the storage or the deletion of the scanned image data corresponds to the function of a CPU 13; the selection unit corresponds to the selection input of an operations panel 30a and the function of the CPU 13; and the display unit corresponds to the operations panel 30a. Furthermore, the respective steps are performed by the CPU 13, and the respective processes of the program are defined by the program code stored in a ROM (not shown).

According to the embodiments of the present invention, the storage or deletion of scanned image data is determined based on detection results of blank-sheet detection units. Therefore, the present invention is capable of determining whether a document is a blank sheet even when receiving image data from scanning units having different scanning characteristics at the same time and attempting to definitely deal with the information of the document in accordance with the determination result.

Other objects, features and advantages of the present invention will become more apparent from the following detailed description when read in conjunction with the accompanying drawings.

DETAILED DESCRIPTION OF THE PREFERRED EMBODIMENTS

Referring to the accompanying drawings, a description is made of embodiments of the present invention.

Figure 1:
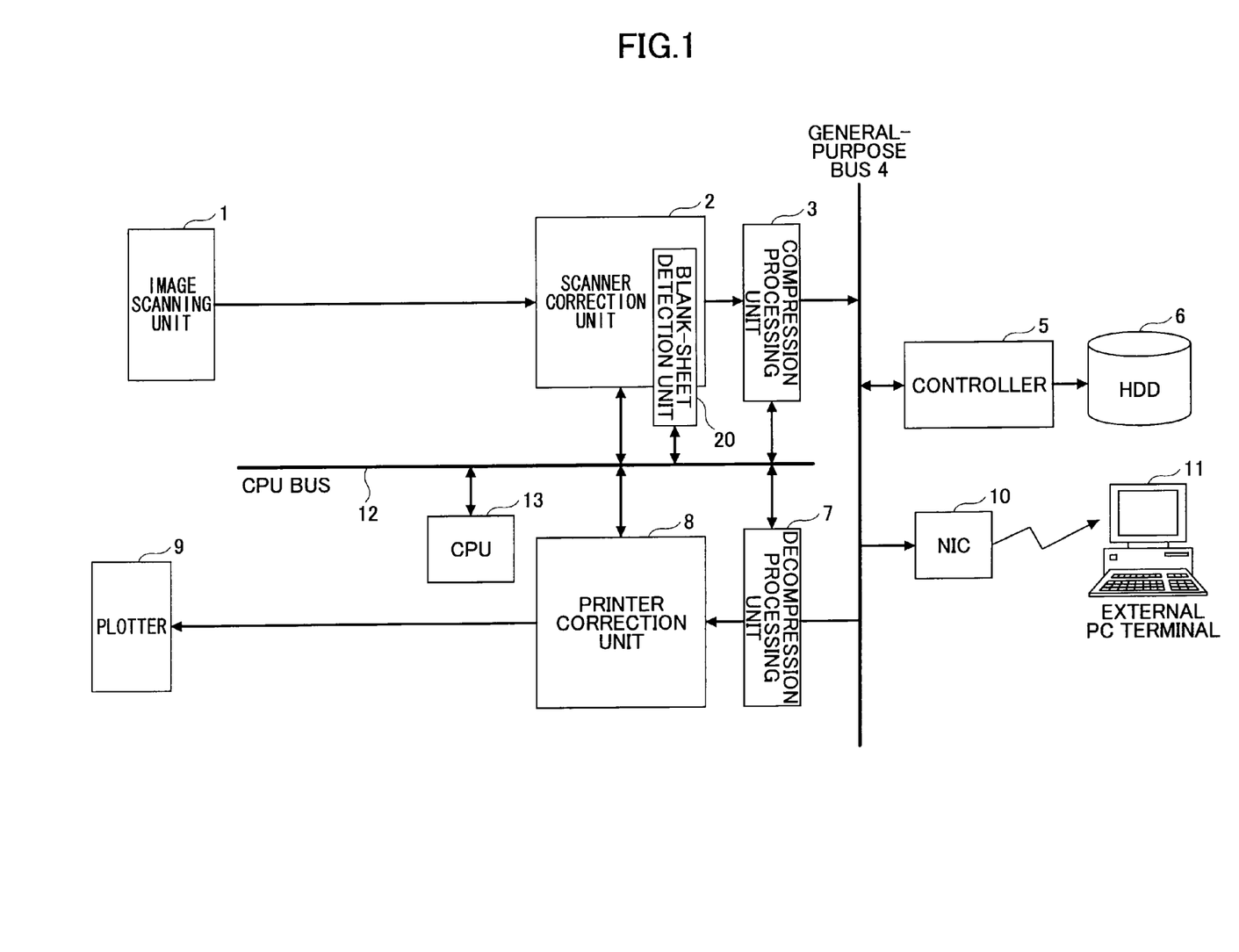
FIG. 1 is a block diagram showing a schematic configuration of a digital color image forming apparatus having a single image scanning unit.

FIG. 1 is a block diagram showing a schematic configuration of a digital color image forming apparatus having a single image scanning unit. When operating as a full-color copier, the image forming apparatus causes an image scanning unit 1 to scan image data separated into the colors of R (Red), G (Green), and B (Blue) from a document and output the image data (analog signals) after converting them into digital data. The image data thus generated are input to a scanner correction unit 2. The scanner correction unit 2 applies to the image data image processing such as scanner γ-correction processing or filter processing in which the image data are classified into characters, line drawings, patterns, etc., of an image area (image area separation) and then emphasizes the characters and smooths the patterns in accordance with a result of determining the image area separation. Thus, the scanning characteristics are corrected. A blank-sheet detection unit 20 as a characteristic of the embodiments of the present invention resides in the scanner correction unit 2.

A compression processing unit 3 compresses the multilevel image data that have been subjected to the scanner correction and transmits the compressed multilevel image data to a general-purpose bus 4. The compressed image data are transferred to a controller 5 via the general-purpose bus 4. Although not shown in FIG. 1, the controller 5 has a semiconductor memory where the transferred image data are accumulated. The accumulated image data are written in a hard disk drive (HDD) 6 serving as a large-capacity storage device when needed. The writing of the accumulated image data in the hard disk drive 6 is performed so that the necessity of rescanning documents is eliminated even if sheets are jammed at the time of print out to cause improper termination of an output, electronic sorting for sorting plural document image data is performed, or scanned documents are accumulated so as to be output again when needed. Note that although the image data are compressed here, it is needless to say that data may be handled in a non-compressed state if the band of a general-purpose bus is wide enough and the capacity of a HDD storing the data is large.

When operating as a copier, the image forming apparatus then causes the controller 5 to transmit the image data of the HDD 6 to a decompression processing unit 7 via the general-purpose bus 4. The decompression processing unit 7 decompresses the compressed image data into the original multilevel data and transmits the decompressed image data to a printer correction unit 8. The printer correction unit 8 performs printer γ-correction processing, gradation processing, etc., and it quantizes the image data with error diffusion processing, dither processing, etc., in accordance with correction processing for the bright and dark characteristic of a plotter, the gradation characteristic of the plotter, and a result of determining an edge/non-edge. A plotter 9 is a transfer sheet printing unit using a laser beam writing process, and it draws the image data on a photosensitive body as latent images and forms a copy image on a transfer sheet after image formation/transfer processing with toner.

Note that according to the embodiments, the units excluding the plotter 9 that perform signal processing from image scanning to image outputting serve as an image processing unit.

When operating as a distribution scanner that distributes the image data to a PC via networks, the image forming apparatus operates in the same processing procedure as when it operates as the copier until the image data are compressed. Then, the image data are transmitted to the controller 5, and the controller 5 performs format conversion processing. As the format conversion processing, a general-purpose image format conversion for JPEG, TIFF, and BMP formats is performed. After that, the image data are distributed to an external PC terminal 11 via a NIC (Network Interface Controller) 10.

Figure 2:
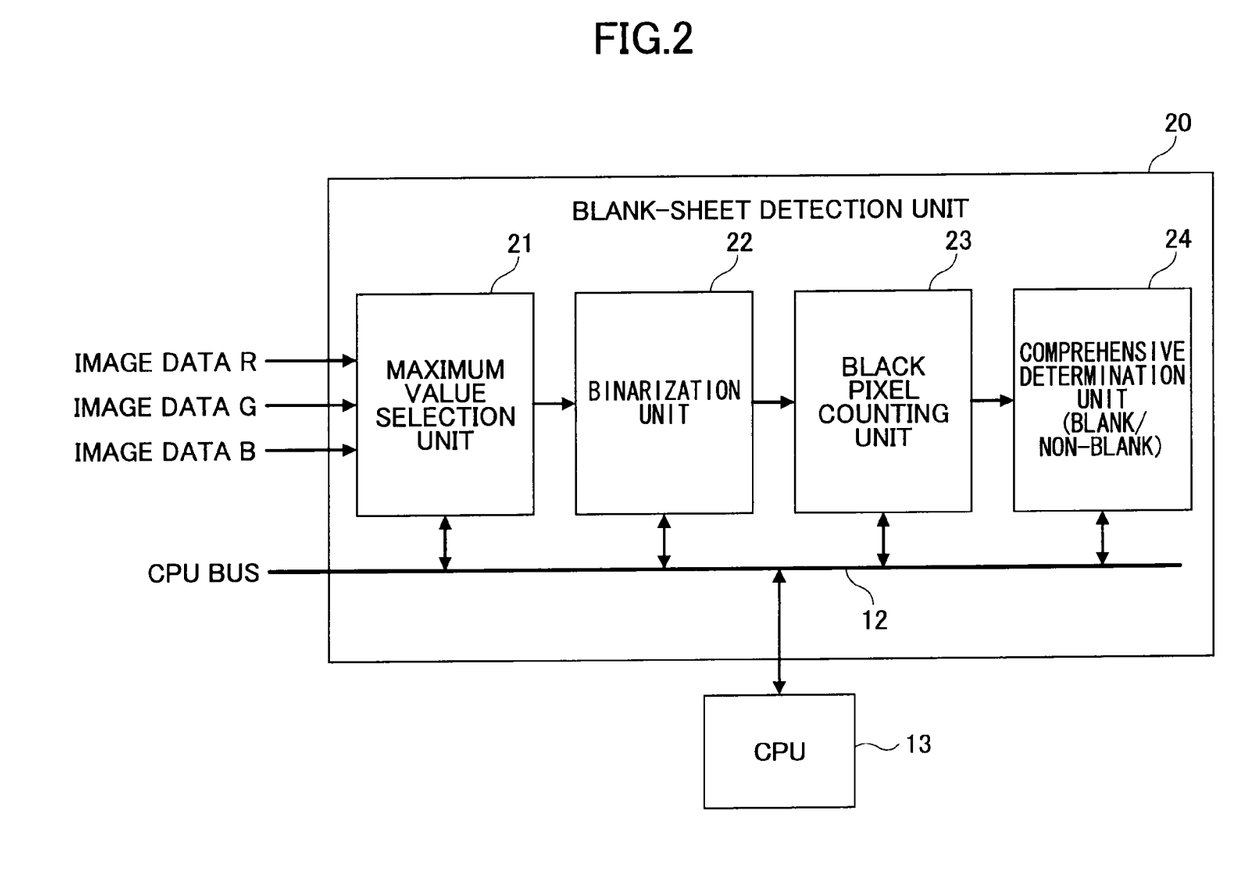
FIG. 2 is a block diagram showing a configuration of a blank-sheet detection unit in FIG. 1.

FIG. 2 is a block diagram showing a configuration of the blank-sheet detection unit 20 in FIG. 1. The blank-sheet detection unit 20 has a maximum value selection unit 21, a binarization unit 22, a black pixel counting unit 23, and a comprehensive determination unit 24, and it selects the maximum value (the color with the highest density) from input RGB multilevel image data at the maximum value selection unit 21 and performs binarization processing in accordance with a certain threshold at the binarization unit 22. The certain threshold is capable of being set from a CPU 13 connected via a CPU bus 12 and rewritten in accordance with the scanning characteristics of the image scanning unit 1. After the binarization processing, the black pixel counting unit 23 makes a count of the number of black pixels. The comprehensive determination unit 24 determines the non-blank/blank state of a document based on how many black pixels exist in the document. A non-blank sheet/blank sheet determination threshold is set from the CPU 13 in the same manner as when the threshold is subjected to the binarization processing. In order to ignore black pixels caused by scumming of the document, which are not document information, only those meeting requirements in consideration of the continuity of the black pixels in vertical and horizontal direction may be identified as candidates for the black pixels to be counted before the number of the black pixels is counted.

The CPU 13 expands a program code stored in a ROM (not shown) into a RAM (not shown) and performs operations defined by the program code using the RAM as a work area.

Figure 3:
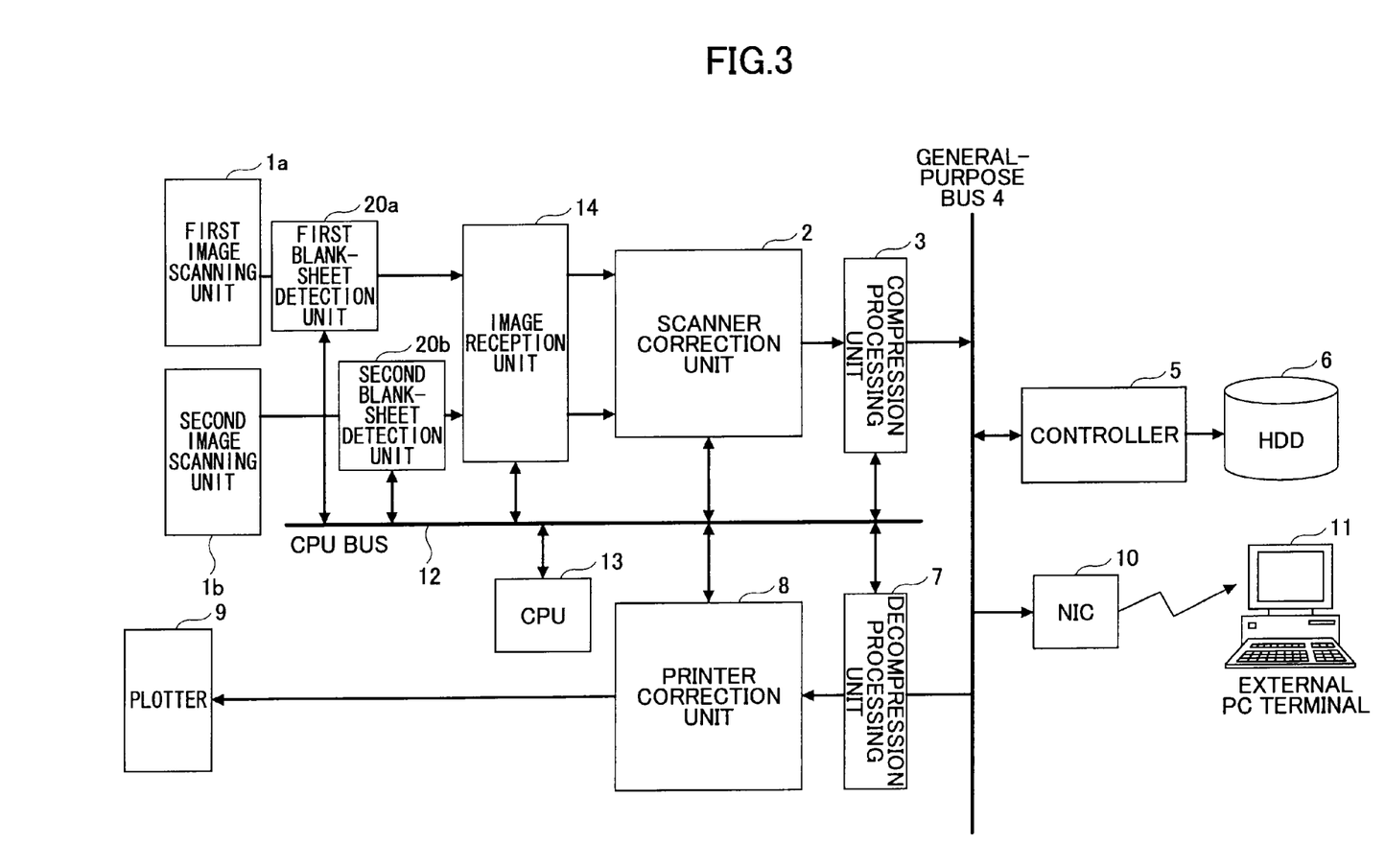
FIG. 3 is a block diagram showing a schematic configuration of an image processing apparatus according to a first embodiment that has two image scanning units adapted to correspond to the front and rear surfaces of a document.

FIG. 3 is a block diagram showing a schematic configuration of an image processing apparatus according to a first embodiment that has two image scanning units adapted to correspond to the front and rear surfaces of a document. As opposed to the image forming apparatus having the single image scanning unit 1 shown in FIG. 1, the image processing apparatus shown in FIG. 3 has first and second image scanning units 1a and 1b. The first and second image scanning units 1a and 1b are connected to first and second blank-sheet detection units 20a and 20b, respectively, and they are buffered by an image reception unit 14 and then input to the scanner correction unit 2. The first and second blank-sheet detection units 20a and 20b are connected to the CPU bus 12 and controlled to perform predetermined operations by the CPU 13. Because the first and second image scanning units 1a and 1b have different scanning characteristics, the first and second blank-sheet detection units 20a and 20b are configured to have the parameters for detecting a blank sheet (such as binarized thresholds and black pixel count thresholds) adapted to correspond to the scanning characteristics. Accordingly, it is possible to receive image data from the plural image scanning units at the same time. Note that the configurations of the first and second blank-sheet detection units 20a and 20b are the same as that shown in FIG. 2, and they are different from each other only in the parameters for detecting a blank sheet as described above.

With this configuration, it is possible to detect whether the document of the image data scanned by the two image scanning units 1a and 1b is a blank sheet and determine whether the scanned image data are cancelled based on the detection results of the blank-sheet detection units 20a and 20b corresponding to the first and second image scanning units 1a and 1b, respectively. At this time, because the first and second blank-sheet detection units 20a and 20b are independent, the parameters (setting values) for detecting a blank sheet can be determined in accordance with the scanning characteristics of the first and second image scanning units 1a and 1b.

According to the first embodiment, as described above, the blank-sheet detection units corresponding to the number of the image scanning units are provided, and the parameters according to the scanning characteristics of the image scanning units are set. Therefore, the image processing apparatus having the two image scanning units can scan a document at the same speed as that when the image forming apparatus having the single image scanning unit does.

Figure 4:
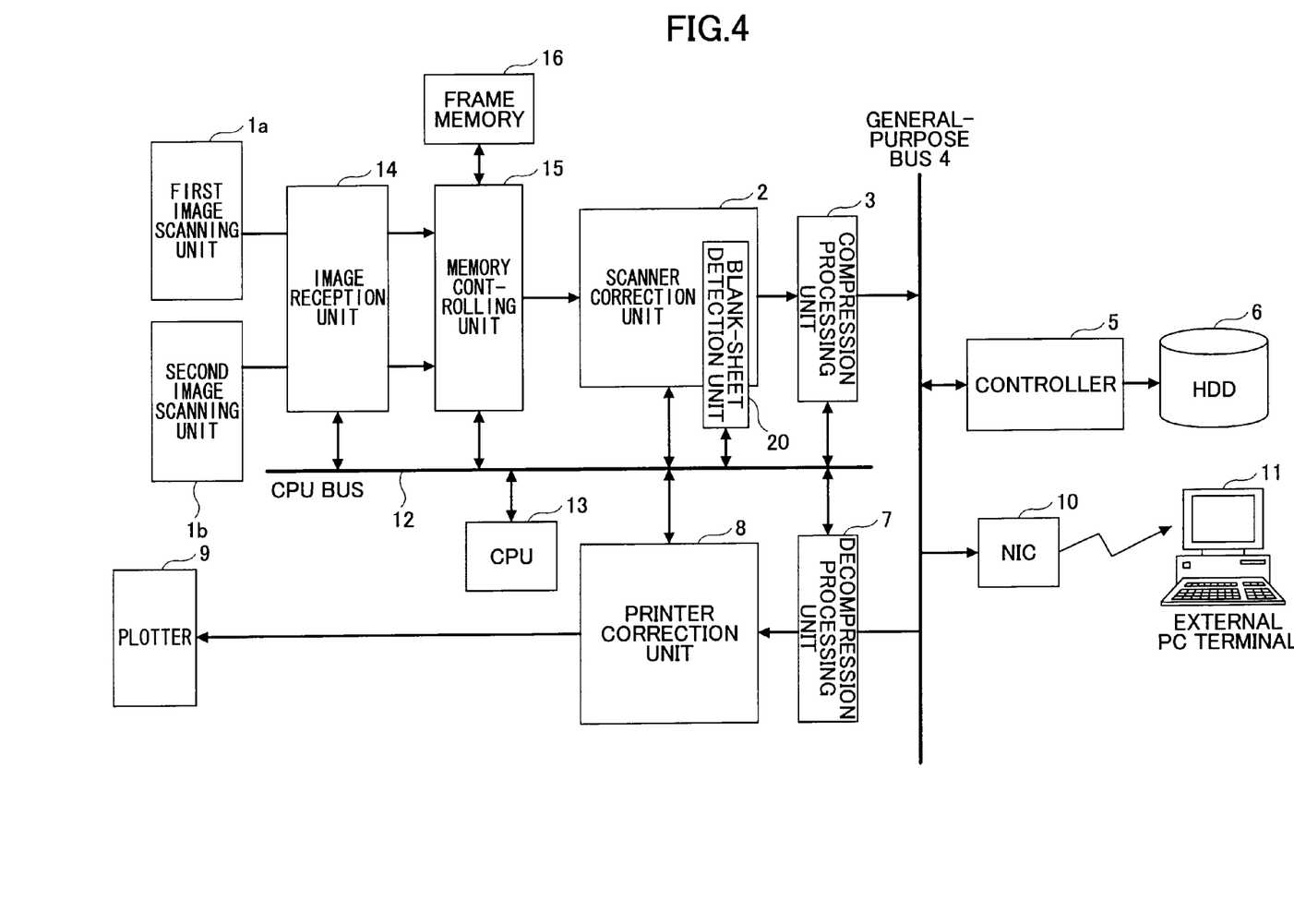
FIG. 4 is a block diagram showing a schematic configuration of an image processing apparatus according to a second embodiment.

FIG. 4 is a block diagram showing a schematic configuration of an image processing apparatus according to a second embodiment. According to the second embodiment, the image data scanned by the first and second image scanning units 1a and 1b are temporarily accumulated in a memory. The scanned image data are retrieved from the memory and then caused to pass through the same image processing path as that shown in FIG. 1 so as to detect a blank sheet.

In other words, the image reception unit 14 is arranged at a stage subsequent to the first and second image scanning units 1a and 1b, and a storage unit including a memory controlling unit 15 and a frame memory 16 is arranged at a stage subsequent to the image reception unit 14. The image data retrieved from the frame memory 16 are input to the scanner correction unit 2. Other configurations of the image processing apparatus according to the second embodiment are the same as those of the image forming apparatus shown in FIG. 1, and the blank-sheet detection unit 20 resides in the scanner correction unit 2.

With this configuration, the image data transferred from the first and second image scanning units 1a and 1b are temporarily accumulated in the frame memory 16 arranged at the stage prior to the scanner correction unit 2. Then, the image data are frame-sequentially retrieved. The parameters for detecting a blank sheet (such as binarized thresholds and black pixel count thresholds) adapted to correspond to the scanning characteristics are provided, and they are changed in accordance with the timing when the image data are retrieved from the frame memory 16.

Figure 5:
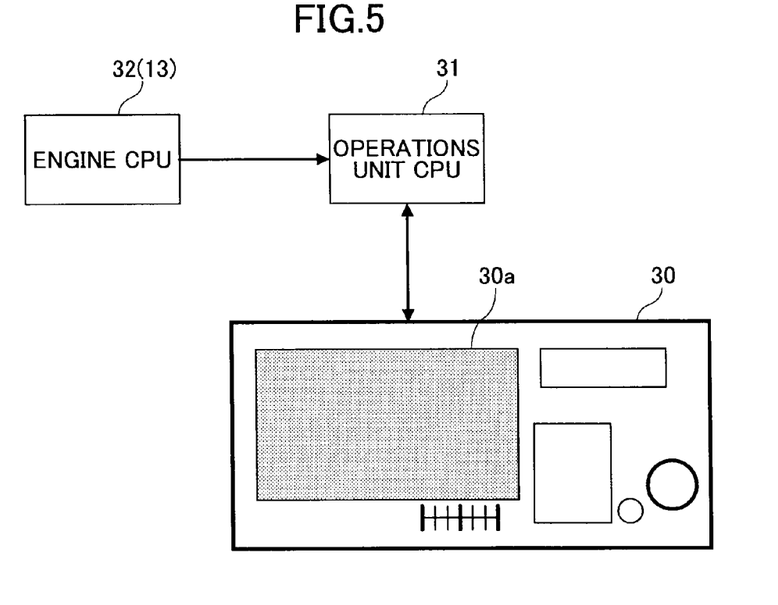
FIG. 5 is a diagram showing a display system that displays the result of detecting a blank sheet.

FIG. 5 is a diagram showing a display system that displays the result of detecting a blank sheet. In the display system shown in FIG. 5, an operations unit CPU 31 is connected to an operations unit 30, and it controls the display and operations input of the operations unit 30. An engine CPU 32 is connected to the operations unit CPU 31. The result of detecting a blank sheet from the blank-sheet detection unit 20 of the scanner correction unit 2 is transmitted to the operations unit CPU 31 via the engine CPU 32 and then displayed on the operations panel 30a of the operations unit 30. Note that the engine CPU 32 corresponds to the CPU 13 shown in FIGS. 3 and 4.

According to the second embodiment, as described above, the frame memory 16 corresponding to plural sheets of documents is arranged at the stage prior to the scanner correction unit 2, and the image data are frame-sequentially retrieved from the frame memory 16. Therefore, the processing after the scanner correction unit 2, particularly, the configuration of the blank-sheet detection unit 20 can be achieved in the same manner as the image forming apparatus having the single image scanning unit.

Figure 6:
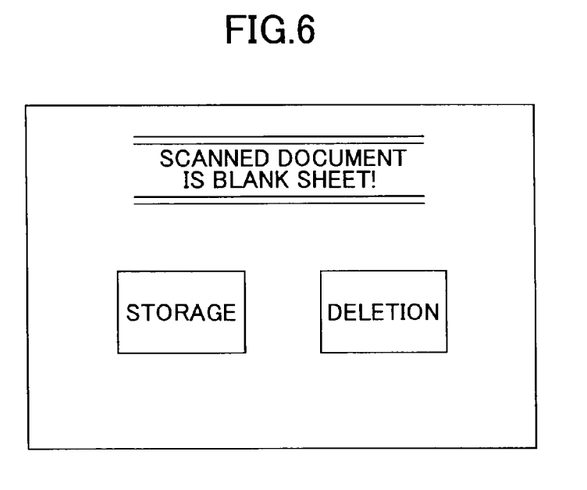
FIG. 6 shows the display content of an operations panel so as to select whether image data are cancelled (deleted or stored) based on the detection result of the blank-sheet detection unit.
Figure 7:
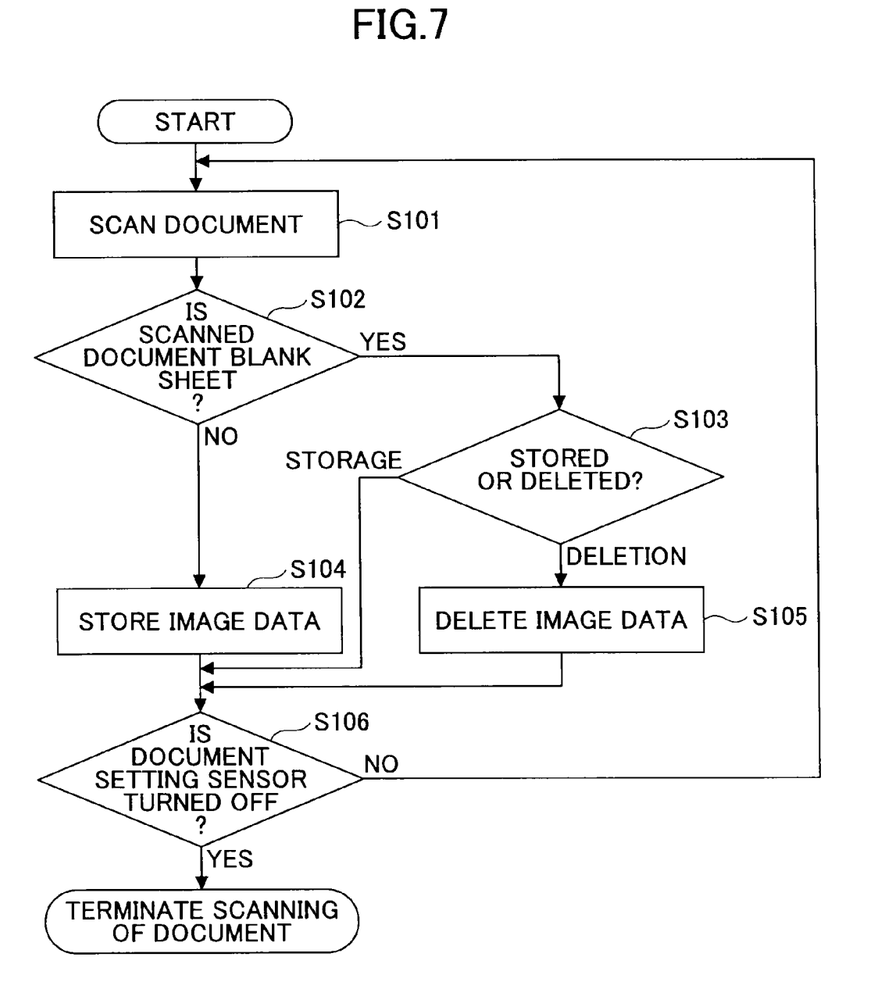
FIG. 7 is a flowchart showing a processing procedure so as to select whether image data are cancelled (deleted or stored) based on the detection result of the blank-sheet detection unit.

FIG. 6 shows the display content of the operations panel 30a so as to select whether image data are cancelled (deleted or stored) based on the detection result of the blank-sheet detection unit 20, and FIG. 7 is a flowchart showing a processing procedure at that time.

As shown in FIG. 7, first, plural sheets of documents are sequentially scanned one after another, while they are fed by a document feeder (step S101). When it is determined that a scanned document is a blank sheet (Yes in step S102), the scanning of the document is suspended. At this time, as shown in FIG. 6, the message "scanned document is a blank sheet!" is displayed on the operations panel 30a, making it possible for the user to select whether the document is deleted or stored. When the user selects the storage of the document (storage in step S103), the image of the document is stored (step S104). On the other hand, when the user selects the deletion of the document (deletion in step S103), the image of the document is deleted (step S105). Then, after a document setting sensor is checked (step S106), the next document is scanned. When it is determined that the document is not a blank sheet (step S102), the image of the document is stored without conditions (step S104).

Accordingly, it is possible for the user to confirm whether the document is a blank sheet every time the document is scanned from the operations panel 30a of the operations unit 30 and to select whether the image of the document is deleted or stored every time the document is scanned. As a result, the user-friendly image processing apparatus can be achieved.

Figure 8:
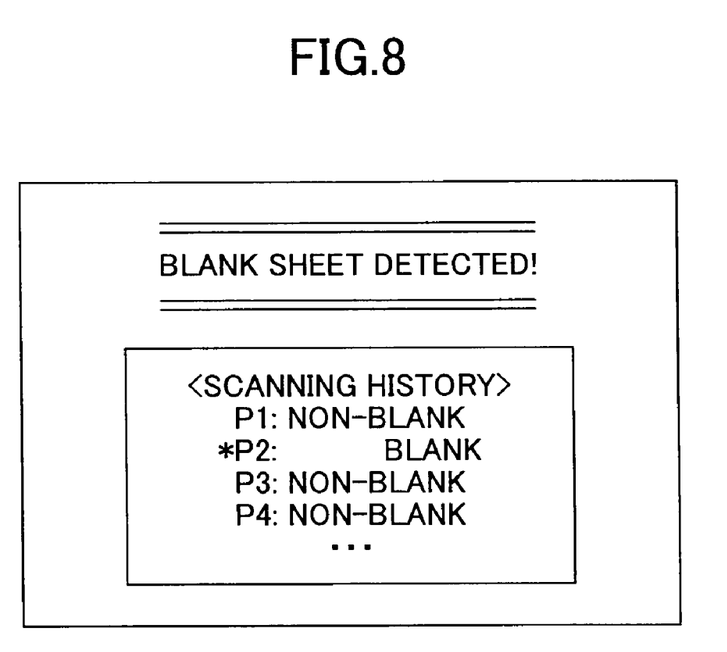
FIG. 8 shows the operations panel that displays the status (blank/non-blank) of image data based on the detection result of the blank-sheet detection unit.
Figure 9:
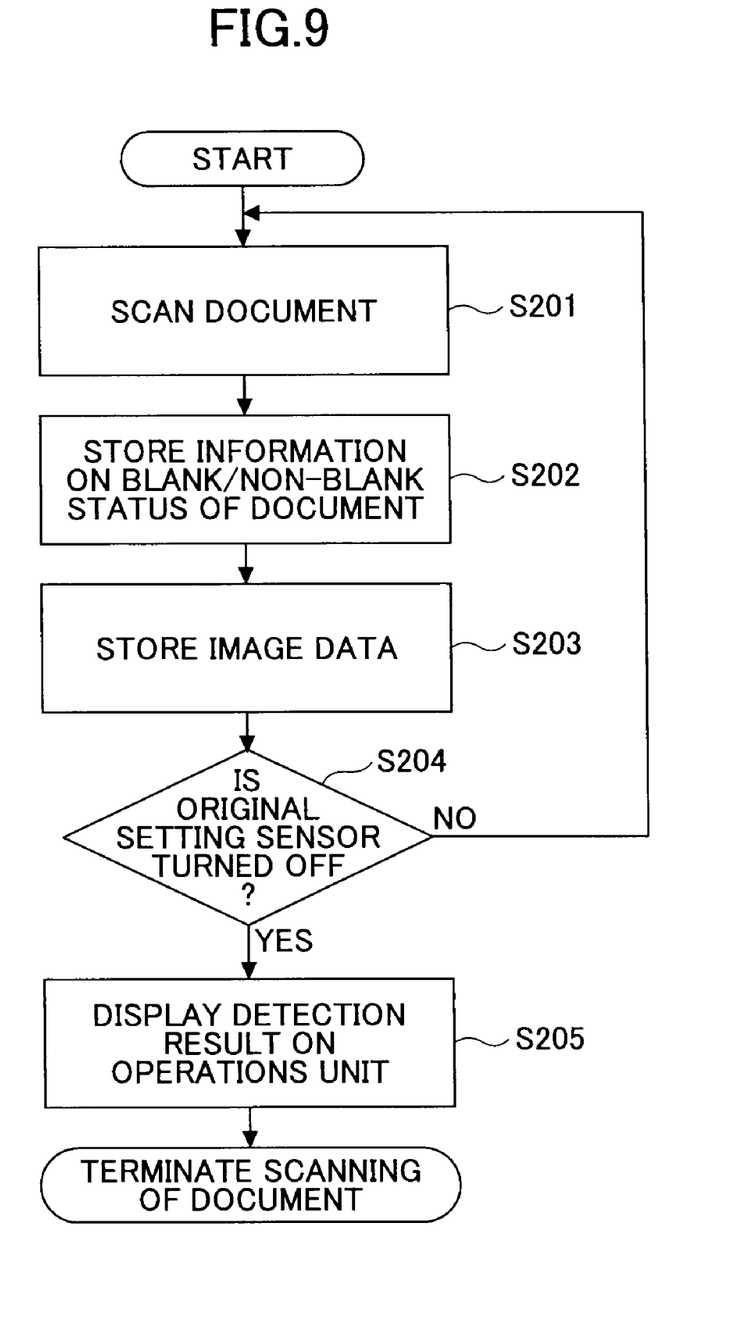
FIG. 9 is a flowchart showing a processing procedure so as to display the status (blank/non-blank) of image data based on the detection result of the blank-sheet detection unit.

FIG. 8 shows the operations panel 30a that displays the status (blank/non-blank) of image data based on the detection result of the blank-sheet detection unit 20, and FIG. 9 is a flowchart showing a processing procedure at that time.

As shown in FIG. 9, first, plural sheets of documents are sequentially scanned one after another, while they are fed by the document feeder (step S201). Then, information as to whether a scanned document is a blank sheet is stored in association with its page number (step S202). After all the set documents are scanned (Yes in steps S203 and S204), the operations panel 30a of the operations unit 30 displays which pages are blank sheets (step S205). The display content at this time is shown in FIG. 8, indicating the status (blank/non-blank) of the documents on a page basis. Note that all the image data of the scanned documents are stored (step S203).

Accordingly, it is possible to accumulate the information as to whether the document is a blank sheet when it is scanned and confirm whether there is any document as a blank sheet when all the documents are scanned. At this time, because all the image information of the scanned documents is stored, it is possible to reduce the risk of missing the image information.

Figure 10:
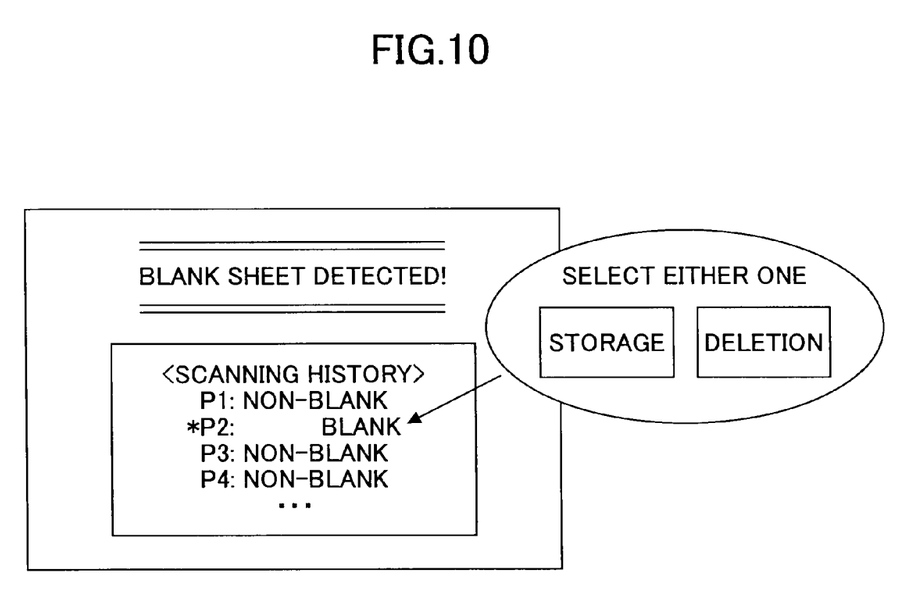
FIG. 10 shows the display content of the operations panel that displays the status (blank/non-blank) of image data and prompts the user to select whether the image data are cancelled (deleted or stored) based on the detection result of the blank-sheet detection unit.
Figure 11:
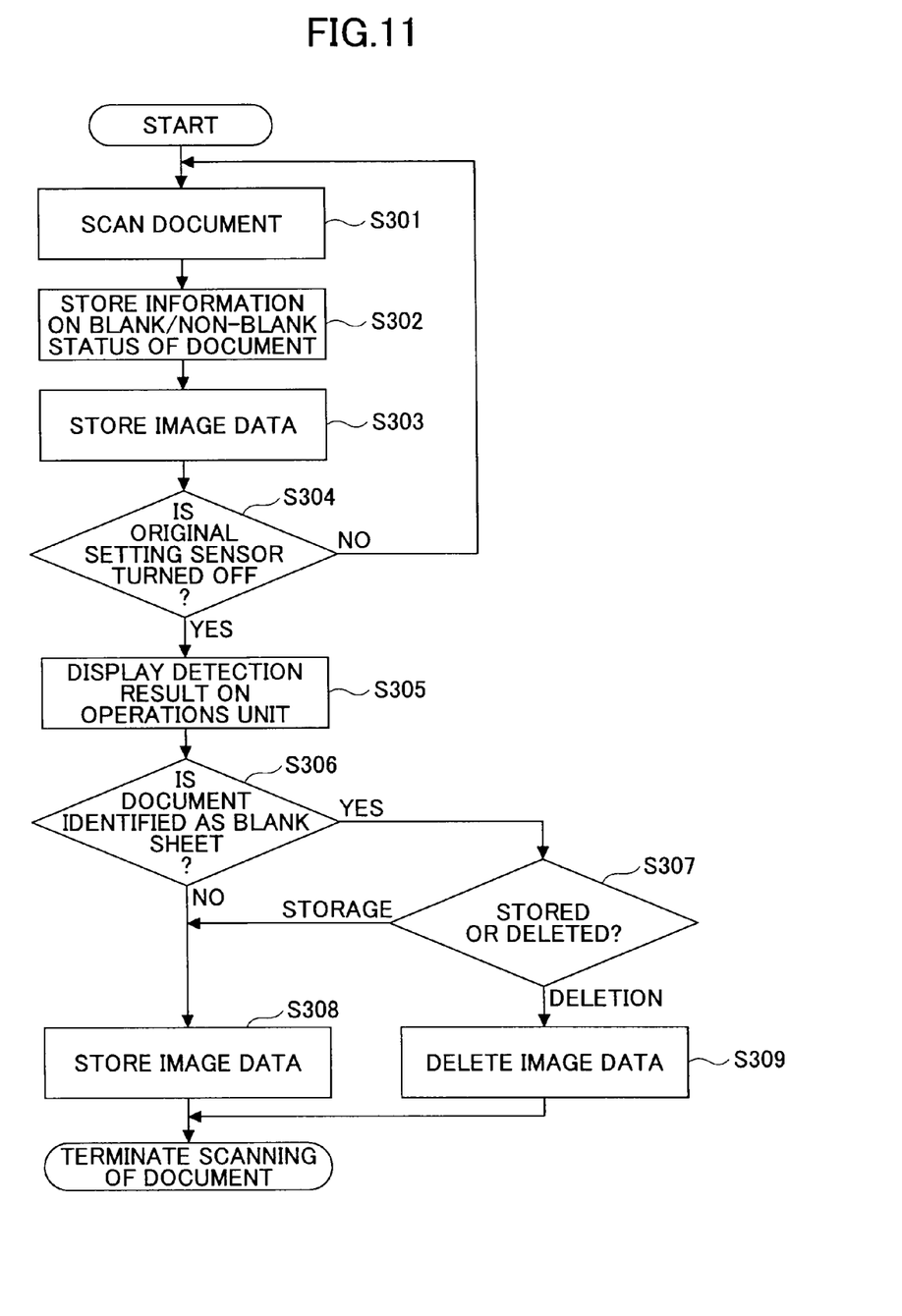
FIG. 11 is a flowchart showing a processing procedure so as to display the status (blank/non-blank) of image data and prompt the user to select whether the image data are cancelled (deleted or stored) based on the detection result of the blank-sheet detection unit.

FIG. 10 shows the display content of the operations panel 30a that displays the status (blank/non-blank) of image data and prompts the user to select whether the image data are cancelled (deleted or stored) based on the detection result of the blank-sheet detection unit 20, and FIG. 11 is a flowchart at that time.

As shown in FIG. 11, first, plural sheets of documents are sequentially scanned one after another, while they are fed by the document feeder (step S301). Then, information as to whether a scanned document is a blank sheet is stored in association with its page number (step S302). After all the set documents are scanned (Yes in steps S303 and S304), the operations panel 30a of the operations unit 30 displays which pages are blank sheets (step S305). At this time, all the image data of the scanned documents are stored. Then, the user selects whether the document as a blank sheet is stored or deleted (Yes in step S306 and step S307). When the user selects the storage of the document (storage in step S307), the image of the document is stored (step S308). On the other hand, when the user selects the deletion of the document (deletion in step S307), the image of the document is deleted (step S309).

As shown in FIG. 10, the display content at this time shows whether the document is a blank sheet on a page basis. When the page of the document is selected by a cursor, a selection screen prompting the user to select whether the document is stored or deleted is further displayed as a pop-up menu.

Accordingly, it is possible to accumulate the information as to whether the document is a blank sheet when it is scanned and confirm whether there is any document identified as a blank sheet when all the documents are scanned. Moreover, because the user is allowed to select whether the image of the scanned document is deleted or stored, it is possible to reduce the risk of missing the image information. Furthermore, because the user is allowed to delete the unnecessary document as a blank sheet while confirming the same, it is possible to save the capacity of a memory.

Figure 12:
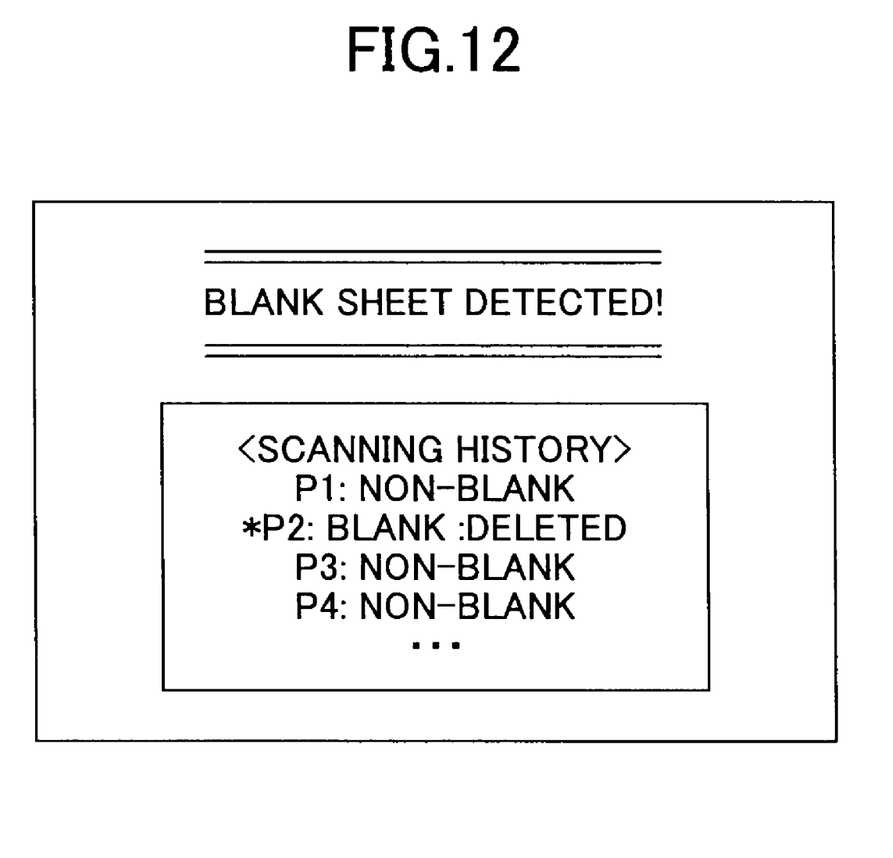
FIG. 12 shows the display content of the operations panel that displays the status (blank/non-blank) of image data and automatically sets whether the image data are cancelled (deleted or stored) based on the detection result of the blank-sheet detection unit.
Figure 13:
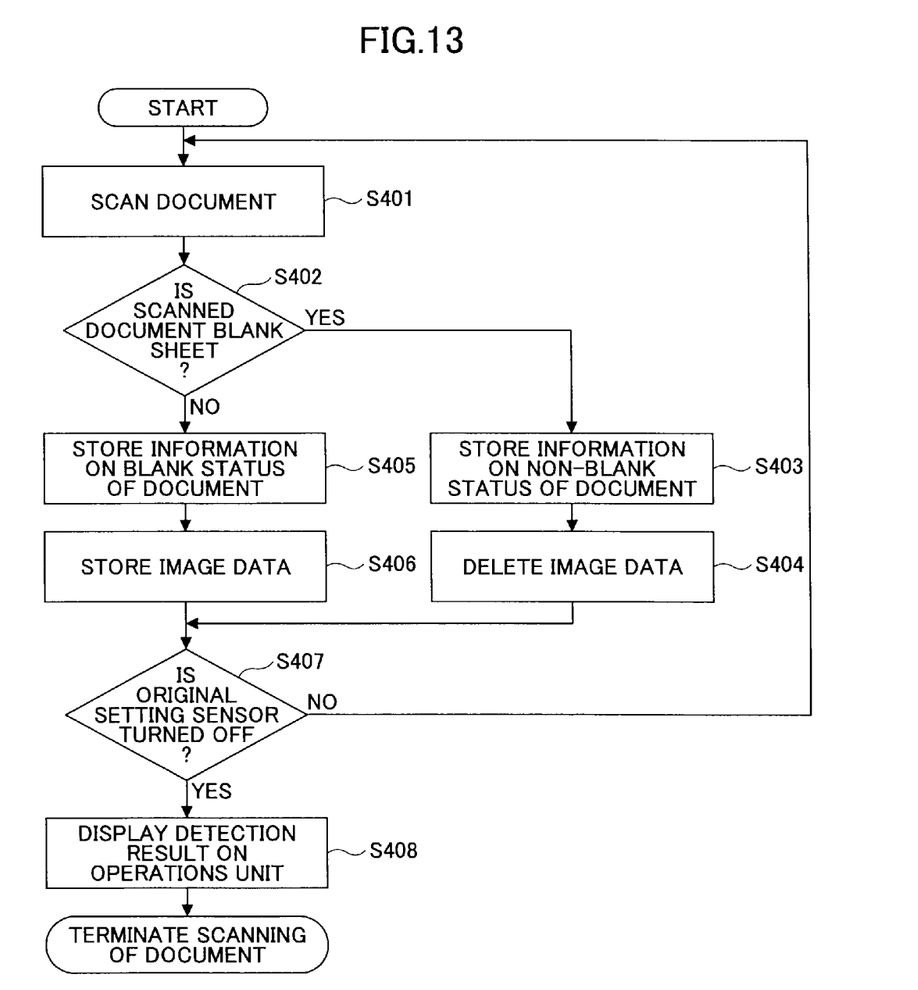
FIG. 13 is a flowchart showing a processing procedure so as to display the status (blank/non-blank) of image data and automatically set whether the image data are cancelled (deleted or stored) based on the detection result of the blank-sheet detection unit.

FIG. 12 shows the display content of the operations panel 30a that displays the status (blank/non-blank) of image data and automatically sets whether the image data are cancelled (deleted or stored) based on the detection result of the blank-sheet detection unit 20, and FIG. 13 is a flowchart at that time.

As shown in FIG. 13, first, plural sheets of documents are sequentially scanned one after another, while they are fed by the document feeder (step S401). Next, it is determined whether a scanned document is a blank sheet (step S402). After determining whether the scanned document is a blank sheet, information as to whether the scanned document is a blank sheet is stored in association with its page number (steps S403, S405, and S406). After all the set documents are scanned (Yes in steps S407), the operations panel 30a of the operations unit 30 displays which pages are blank sheets (step S408). However, because the image data of the scanned document identified as a blank sheet are deleted immediately (step S404), they are not accumulated.

As the display content at this time, in the column of the page number of a blank sheet and the message indicating that the document is the blank sheet shown in FIG. 8, the message indicating that the document as a blank sheet is "deleted" is added as shown in FIG. 12.

Accordingly, it is possible to accumulate the information as to whether the document is a blank sheet when it is scanned and confirm whether there is any document as a blank sheet when all the documents are scanned. Furthermore, because the document identified as a blank sheet is automatically deleted, it is possible not only to save time for editing a memory but also to save the capacity of the memory.

The present invention is not limited to the specifically disclosed embodiments, but variations and modifications may be made without departing from the scope of the present invention.

The present application is based on Japanese Priority Application No. 2007-249930 filed on Sep. 26, 2007, the entire contents of which are hereby incorporated herein by reference.

What is claimed is:

1. An image processing apparatus that receives image data scanned by plural scanning units and performs various image processing, the image processing apparatus comprising:
   plural blank-sheet detection units that detect whether plural scanned image data represent blank sheets, wherein storage or deletion of the scanned image data is determined based on detection results of the blank-sheet detection units based on whether the scanned image data represent a blank sheet,
   respective setting values of the blank-sheet detection units are determined in accordance with respective scanning characteristics of the scanning units, and
   a display unit that displays statuses of the storage and the deletion of the scanned image data together with associated information indicating whether the scanned image data represent a blank sheet.

2. An image processing apparatus that receives scanned image data scanned by plural scanning units and performs various image processing via a predetermined image processing path, the image processing apparatus comprising:
   a storage unit that temporarily stores the scanned image data; and
   an image processing unit that retrieves the stored image data and performs image processing of the retrieved image data via the predetermined image processing path, wherein
   the image processing unit includes a blank-sheet detection unit configured to detect a blank sheet,
   respective setting values of the blank-sheet detection unit are determined in accordance with respective scanning characteristics of the plural scanning units, and
   a display unit that displays statuses of storage and deletion of the retrieved image data together with associated information indicating whether the retrieved image data represent a blank sheet.

3. The image processing apparatus according to claim 2, wherein the blank-sheet detection unit is provided in the predetermined image processing path.

4. The image processing apparatus according to claim 2, wherein
   the blank-sheet detection unit changes a setting value for detecting a blank sheet in accordance with respective scanning characteristics of the plural scanning units and a timing of when the retrieved image data was scanned by the scanning units.

5. The image processing apparatus according to claim 1, wherein the display unit that displays a detection result of the blank-sheet detection units.

6. The image processing apparatus according to claim 1, further comprising:
   a selection unit that provides an option to select whether the scanned image data are stored or deleted based on the detection results of the blank-sheet detection units.

7. The image processing apparatus according to claim 5, wherein the detection result includes a message as to whether the scanned image data represents a blank sheet based on the detection results of the blank-sheet detection units.

8. The image processing apparatus according to claim 7, further comprising:

a selection unit that selects whether the scanned image data are stored or deleted based on a display of the display unit, which is displayed after receiving the scanned image data.

9. An image forming apparatus having the image processing apparatus according to claim 1.

10. A non-transitory computer readable medium having recorded therein an image processing program that when executed by a computer, causes the computer to perform a method for receiving image data scanned by plural scanning units and performing various image processing, the method comprising:

a detection process of detecting whether the scanned image data represent a blank sheet with plural blank-sheet detection units, the detection process performed in accordance with respective setting values corresponding to respective scanning characteristics of the plural scanning units;

a determining process of determining storage or deletion of the scanned image data based on detection results of the detection process based on whether the scanned image data represent a blank sheet; and a display process of displaying statuses of the storage and the deletion of the scanned image data together with associated information indicating whether the scanned image data represent a blank sheet.

11. The image processing apparatus according to claim 1, further comprising:

a black pixel counting unit configured to count a number of black pixels in the scanned image data; and a comprehensive determination unit configured to determine whether the scanned image data represent a blank sheet based on a comparison of a first threshold value with a counted number of black pixels by the black pixel counting unit.

12. The image processing apparatus according to claim 11, further comprising:

a binarization unit configured to binarize each pixel of the scanned image data to create the black pixels counted by the black pixel counting unit.

13. The image processing apparatus according to claim 12, wherein the black pixel counting unit is configured to identify candidate black pixels as black pixels to be counted in the scanned image data based on a continuity of the candidate black pixels.

14. The image processing apparatus according to claim 13, wherein the candidate black pixels include only pixels meeting a vertical and horizontal continuity requirement.

15. The image processing apparatus according to claim 8, wherein the selection unit provides an option to select whether each of the scanned image data is stored or deleted, and each of the scanned image data is stored or deleted based on user input.

* * * * *